United States Patent
Song et al.

(10) Patent No.: US 8,098,935 B2
(45) Date of Patent: Jan. 17, 2012

(54) APPARATUS AND METHOD FOR RECOGNIZING PATTERN DATA IN A MOBILE TERMINAL

(75) Inventors: Gun-Chul Song, Seoul (KR); Jae-Heog Jang, Seongnam-si (KR)

(73) Assignee: Samsung Electronics Co., LTD (KR)

( * ) Notice: Subject to any disclaimer, the term of this patent is extended or adjusted under 35 U.S.C. 154(b) by 976 days.

(21) Appl. No.: 11/299,473

(22) Filed: Dec. 12, 2005

(65) Prior Publication Data

US 2006/0153442 A1 Jul. 13, 2006

(30) Foreign Application Priority Data

Jan. 7, 2005 (KR) .................. 10-2005-0001680

(51) Int. Cl.
*G06K 9/00* (2006.01)
(52) U.S. Cl. .................................... 382/181
(58) Field of Classification Search .......... 382/181, 382/182, 231, 100
See application file for complete search history.

(56) References Cited

U.S. PATENT DOCUMENTS

| | | | |
|---|---|---|---|
| 5,714,745 A | 2/1998 | Ju et al. | |
| 6,868,182 B2 * | 3/2005 | Kasutani | 382/190 |
| 6,981,644 B2 * | 1/2006 | Cheong et al. | 235/462.04 |
| 7,315,652 B2 * | 1/2008 | Takahashi et al. | 382/233 |
| 2001/0014901 A1 | 8/2001 | Dougherty et al. | |
| 2003/0209605 A1 | 11/2003 | Walczyk et al. | |
| 2004/0035937 A1 | 2/2004 | Kashi et al. | |
| 2004/0105032 A1 * | 6/2004 | Kim et al. | 348/607 |

FOREIGN PATENT DOCUMENTS

| | | |
|---|---|---|
| JP | 10-507560 | 7/1998 |
| JP | 2000-322508 | 11/2000 |
| JP | 2004-153849 | 5/2004 |
| KR | 1020040013571 | 2/2004 |
| WO | WO 97/05560 | 2/1997 |
| WO | WO 03/041014 | 5/2003 |

OTHER PUBLICATIONS

S. Hullfish & J. Fowler: "Color Correction for Digital Video", CMP Media LLC, XP002615724, 2003.

* cited by examiner

*Primary Examiner* — Brian Q Le
*Assistant Examiner* — Edward Park
(74) *Attorney, Agent, or Firm* — The Farrell Law Firm, P.C.

(57) ABSTRACT

Provided is an improved apparatus and method for recognizing pattern data. The method including extracting a high frequency component with Y data from pattern data sensed through a camera equipped in a mobile station to more clearly recognize edge portions. The high frequency component and the Y data are weighted with predetermined weights, and input data is generated using the high frequency component and Y data weighted with the pre-set weights. Accordingly, edge portions of the input data are more clearly defined, thereby increasing a recognition rate of the pattern data.

5 Claims, 5 Drawing Sheets

APPARATUS AND METHOD FOR RECOGNIZING PATTERN DATA IN A MOBILE TERMINAL

PRIORITY

This application claims priority under 35 U.S.C. §119 to an application entitled "Improved Apparatus and Method for Recognizing Pattern Data" filed in the Korean Intellectual Property Office on Jan. 7, 2005 and assigned Serial No. 2005-1680, the contents of which are incorporated herein by reference.

BACKGROUND OF THE INVENTION

1. Field of the Invention

The present invention relates generally to a mobile station, and in particular, to a hot code service in a mobile station.

2. Description of the Related Art

Commonly, a "hot code" service refers to a service in which when a user holds a bar code printed in a newspaper, a magazine, a leaflet, etc., up to a camera equipped in a mobile station, the mobile station automatically accesses related Internet content or shopping content. Thus, the hot code service allows a user to conveniently access and/or use a specific content (e.g., bell sound or MP3 music corresponding to the hot code). Moreover, the hot code service simplifies the process of accessing the content by omitting unnecessary content access steps such as logging in to a server, and provides immediate access to a wireless Internet server to download relevant content. Accordingly, access time is reduced thereby allowing the user to use desired content simply and quickly without incurring unnecessary communication fees.

The hot code service is achieved by sensing a hot code or a bar code printed in a newspaper or a magazine, recognizing it as an image, and recognizing a pattern on the recognized image. Thus, a technique of recognizing a hot code or a bar code in a mobile station using a hot code service method is most important. FIG. 1 is a flowchart illustrating a conventional method of recognizing a hot code or a bar code.

Referring to FIG. 1, when a user wants to recognize monochromatic data such as general hot code or bar code (hereinafter, pattern data), the user holds the pattern data up to a camera equipped in a mobile station. Then, in step 100, a controller of the mobile station senses that an image of the pattern data is input to a camera unit at that moment. In step 102, the controller of the mobile station recognizes red, green and blue (RGB) data of the sensed pattern data as YCbCr data (which will be described below). In step 104, the controller of the mobile station extracts Y data from the recognized YCbCr data. Herein, Y data is image brightness data used in pattern recognition, i.e., data related to black and white, Cb data is blue data having a characteristic of high frequency component data, which is included in the pattern data, and Cr data is red data having a characteristic of low frequency component data, which is included in the pattern data. In step 106, the image is recognized using only the Y data. That is, the conventional method of recognizing an image of pattern data in which an image of the pattern data is recognized using only the extracted Y data among the recognized Y data, Cb data, and Cr data. The image recognition allows the user to use an operation according to the recognized pattern image, i.e., specific Internet content, shopping content, etc.

However, in the conventional method of recognizing an image of pattern data, since recognition of pattern data is performed with only a brightness component of the pattern data, i.e., Y data, a recognition rate of the pattern data is low.

FIG. 2A illustrates a typical hot code, and FIG. 2B illustrates image data obtained by recognizing the hot code illustrated in FIG. 2A using the conventional method of recognizing an image of pattern data.

Referring to FIGS. 2A and 2B, in the conventional method of recognizing an image of pattern data, a recognition rate decreases as largely as edges of pattern data are hardly identified. Yet, if a structure of the pattern data is not that complicated, the recognition may be possible without large problems in the conventional method of recognizing an image of pattern data. However, the number and kinds of wireless contents is increasing day by day accompanying development of Internet services, and therefore, structures of pattern data will be more complicated. Thus, a method and apparatus for recognizing pattern data, which has a recognition rate higher than that of the conventional method of recognizing pattern data, is required without delay.

Accordingly, an apparatus and method for recognizing pattern data having a recognition rate which is improved when compared to the conventional apparatus and method of recognizing pattern data, is desired.

SUMMARY OF THE INVENTION

An object of the present invention is to substantially solve at least the above problems and/or disadvantages and to provide at least the advantages below. Accordingly, an object of the present invention is to provide an improved apparatus and method for recognizing pattern data in which a recognition rate is increased when compared to the conventional method of recognizing pattern data.

According to one aspect of the present invention, there is provided an improved apparatus for recognizing pattern data in a mobile station having a pattern data recognition function, the apparatus including: a pattern data sensing unit for recognizing and extracting Y data and high frequency component data from pattern data when an input of the pattern data is sensed; a pattern data recognizing unit for weighting the extracted Y data with a first weight, weighting the extracted high frequency component data with a second weight, and thereafter generating input data for recognizing the pattern data using the Y data weighted with the first weight and the high frequency component data weighted with the second weight; and a controller for controlling the pattern data sensing unit to transmit the extracted Y data and the extracted high frequency component data to the pattern data recognizing unit and recognizing an image according to the pattern data by receiving the generated input data.

According to one aspect of the present invention, there is provided an improved method of recognizing pattern data in a mobile station having a pattern data recognition function, the method including: sensing an input of pattern data; recognizing and extracting Y data and high frequency component data from the pattern data; weighting the extracted Y data and the extracted high frequency component data with respective weights and thereafter generating input data for recognizing the pattern data using the weighted Y data and the weighted high frequency component data; and recognizing an image according to the pattern data using the generated input data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
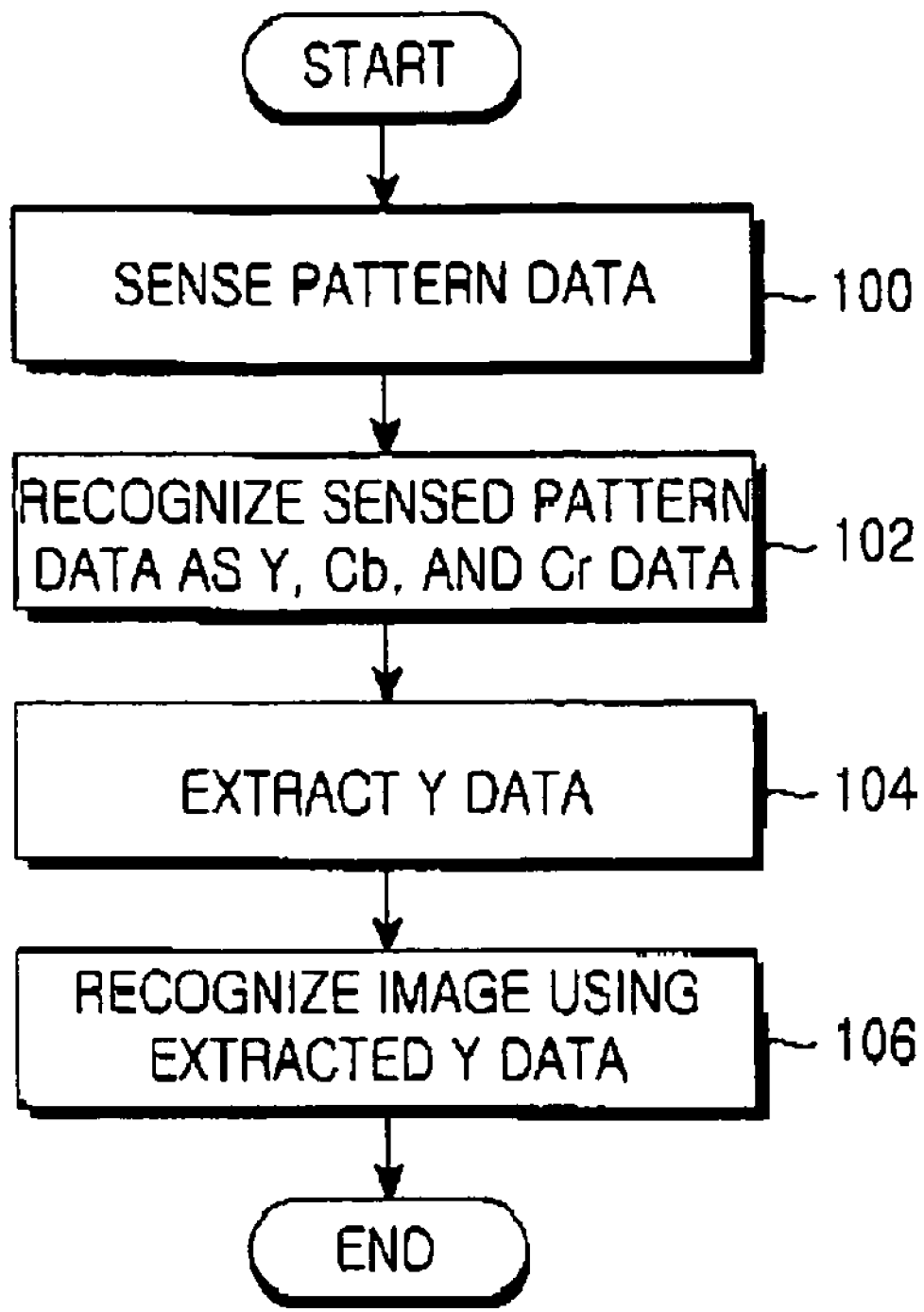
FIG. 1 is a flowchart illustrating a conventional method of recognizing an image from a hot code sensed by a mobile station.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

Figure 3:
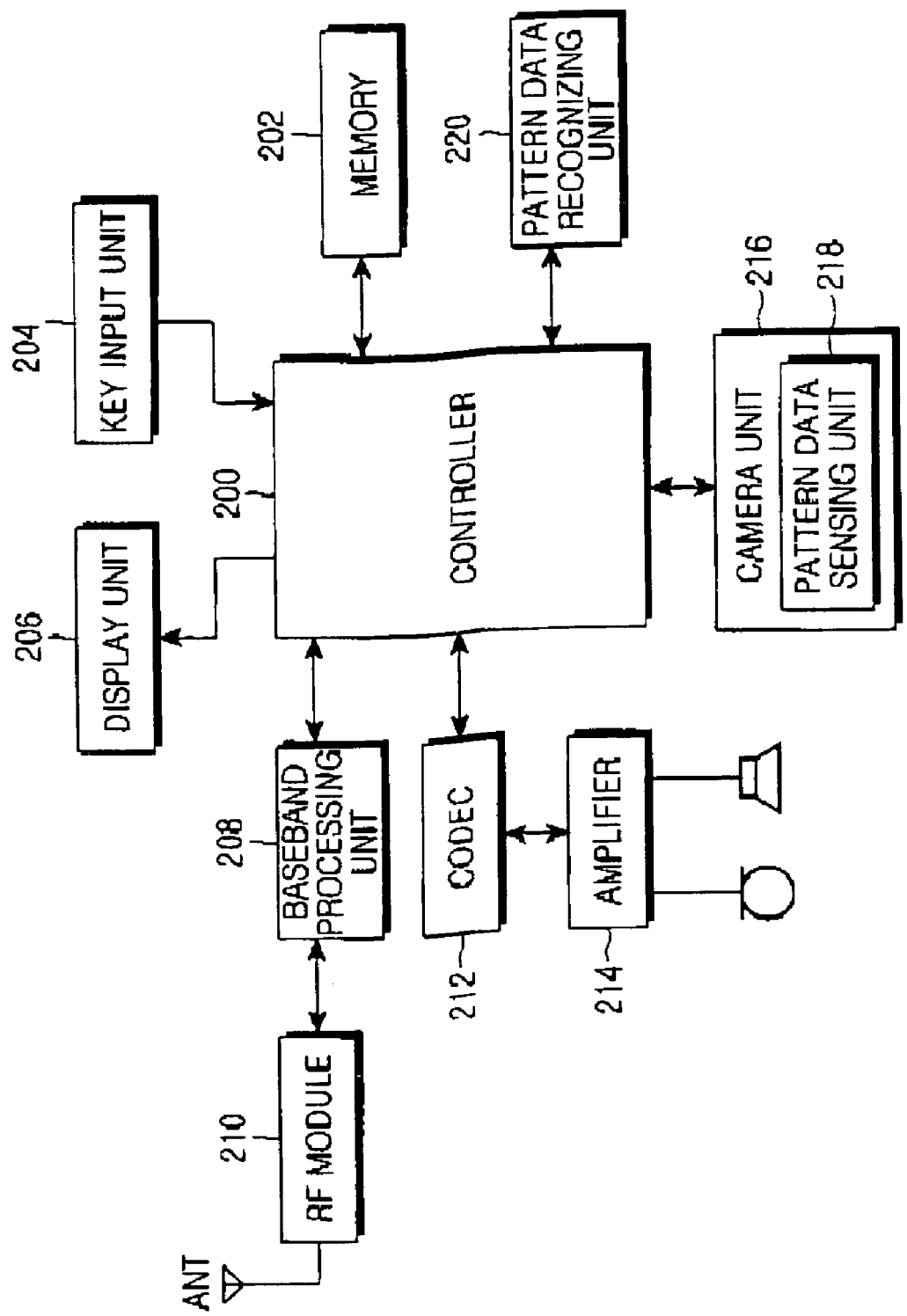
FIG. 3 is a block diagram of a mobile station according to a preferred embodiment of the present invention.

To achieve a full understanding of the present invention, the basic principle of the present invention will now be described. In the present invention, an increased pattern data recognition rate is provided by extracting a high frequency component from sensed pattern data to more clearly recognize edge portions and recognizing the pattern data using the high frequency component with Y data. FIG. 3 is a block diagram of a mobile station according to a preferred embodiment of the present invention. Referring to FIG. 3, in the mobile station according to a preferred embodiment of the present invention, a memory 202, a key input unit 204, a display unit 206, a baseband processing unit 208, a coder-decoder (CODEC) 212, a camera unit 216, and a pattern data recognizing unit 220 are connected to a controller 200. The controller 200 processes a phone call and/or data communication, processes a voice signal and data according to a protocol for a wireless Internet access, and controls components of the mobile station. In addition, the controller 200 receives a user's key input through the key input unit 204 and controls the display unit 206 to generate image information corresponding to the user's key input and display the generated image information. When pattern data is sensed through the camera unit 216, the controller 200 controls a pattern data sensing unit 218 included in the camera unit 216 to recognize the pattern data as Y data, Cb data, and Cr data and extract the Y data, which is a brightness component, and the Cb data, which is a high frequency component, among the recognized data. The Y data and Cb data extracted by the pattern data sensing unit 218 are input to the pattern data recognizing unit 220. The controller 200 controls the pattern data recognizing unit 220 to weight the extracted Y data and Cb data with predetermined weights and generate input data in which the high frequency component Cb data is also included.

In brief, the camera unit 216 connected to the controller 200 stores an image in response to a user's key input, and when the image includes pattern data, the camera unit 216 extracts Y data and Cb data using the equipped pattern data sensing unit 218 and outputs the extracted Y data and Cb data to the controller 200. Then, the pattern data recognizing unit 220 connected to the controller 200 receives the Y data and Cb data from the controller 200, generates input data by weighting each of the extracted Y and Cb data with a corresponding weight chosen from the predetermined weights, and outputs the generated input data to the controller 200.

The memory 202 connected to the controller 200 includes a Read Only Memory (ROM), flash memory, and Random Access Memory (RAM). The ROM stores therein program(s) and/or various types of reference data for processing and controlling of the controller 200, the RAM provides a working memory of the controller 200, and the flash memory provides an area to store various kinds of updatable storage data. The key input unit 204 includes various types of keys including numeric keys and provides key inputs input by a user to the controller 200. A radio frequency (RF) module 210 transmits and/receives an RF signal to and/or from a base transceiver station. In detail, the RF module 210 converts a received RF signal to an intermediate frequency (IF) signal and outputs the IF signal to the baseband processing unit 208 connected to the controller 200, and converts an IF signal input from the baseband processing unit 208 to an RF signal and transmits the converted RF signal. The baseband processing unit 208, which is a baseband analog ASIC (BBA) for providing an interface between the controller 200 and the RF module 210, converts a baseband digital signal to an analog IF signal and outputs the converted analog IF signal to the RF module 210, and converts an analog IF signal input from the RF module 210 to a baseband digital signal and outputs the converted baseband digital signal to the controller 200. The CODEC 212 connected to the controller 200 and connected to a microphone and a speaker via an amplifier 214 outputs to the controller 200 voice data obtained by Pulse Code Modulation (PCM) encoding a voice signal input from the microphone and outputs a voice signal obtained by PCM decoding voice data input from the controller 200 to the speaker through the amplifier 214. The amplifier 214 amplifies a voice signal input from the microphone or output to the speaker, and the controller 200 controls the amplifier 214 to adjust a speaker volume and a microphone gain.

Figure 4:
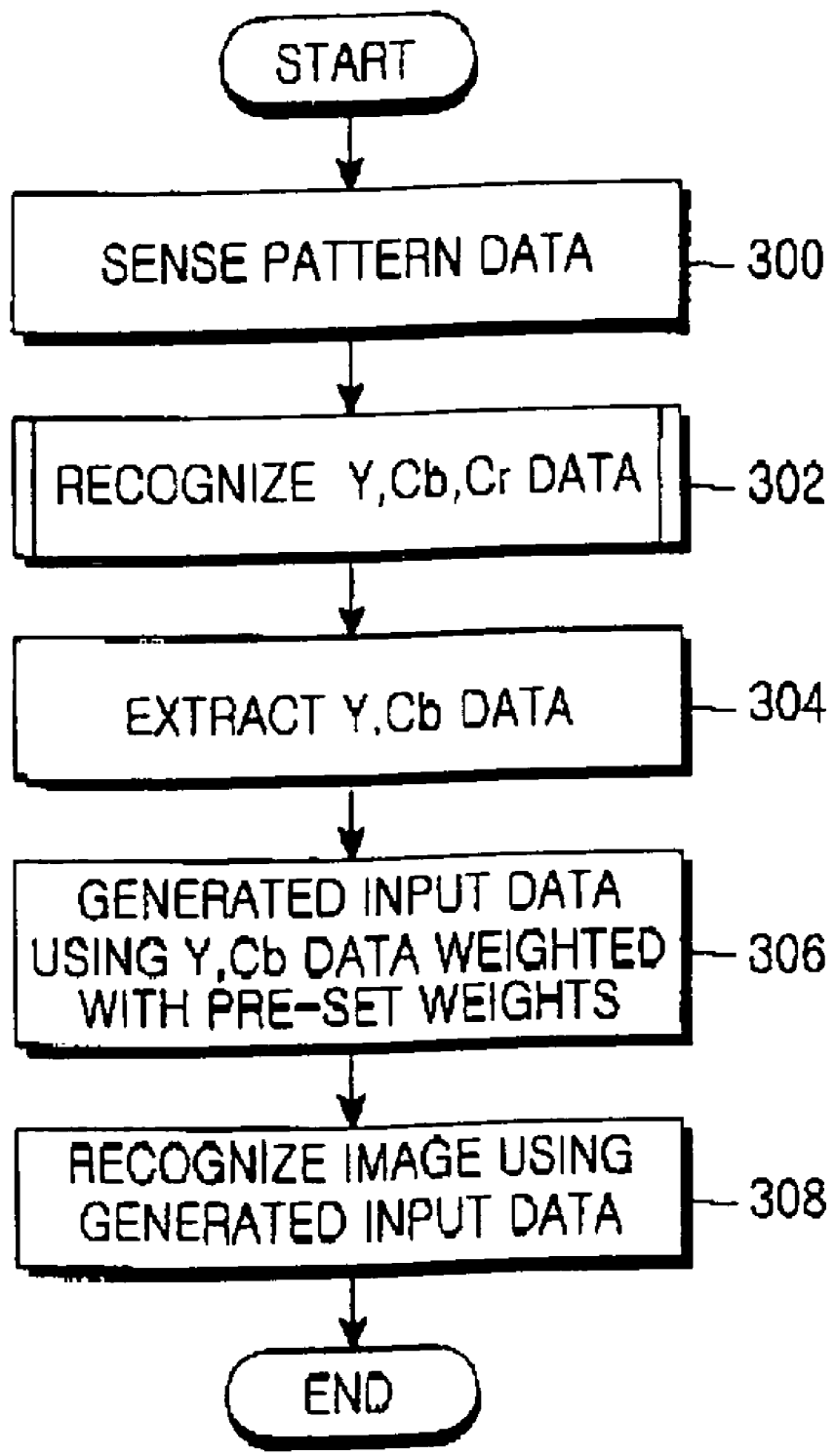
FIG. 4 is a flowchart illustrating a process of recognizing an image from pattern data according to a preferred embodiment of the present invention.

FIG. 4 is a flowchart illustrating a process of recognizing an image from pattern data according to a preferred embodiment of the present invention. Referring to FIG. 4, when a user holds specific pattern data up to a camera equipped in a mobile station according to a preferred embodiment of the present invention, in step 300, the controller 200 senses the pattern data input through the camera. In step 302, the sensed pattern data is recognized as Y data, Cb data, and Cr data based on predetermined recognition resolution. In step 304, the Y data and the Cb data are extracted among the data recognized in step 302.

In step 306, the controller 200 recognizes the pattern data by weighting the extracted Y data and Cb data with predetermined weights. Herein, input data is generated by weighting the Y data and the Cb data with the predetermined weights as shown below in Equation 1.

$$(Y \times \text{first weight} + Cb \times \text{second weight} - \text{compensation value})/\text{third weight} = \text{input data} \quad (1)$$

In Equation 1) the first weight and the second weight are predetermined values which are used to derive an optimal pattern recognition value using the Y data and the Cb data in the recognition of the pattern data, respectively. The compensation value which is used is a value to compensate the pattern recognition value so that the input data can be derived within a recognizable, valid value. The third weight is a constant value which is used to obtain an average of the weights on the Y data and the Cb data. Thus, when the input data containing the Y data and the Cb data is generated according to Equation 1, in step 308, the controller 200 recognizes the pattern image using the generated input data. The recognized pattern image is used to automatically connect to related wireless Internet content or shopping content, and thereby the user can use the related content.

Figure 2A:
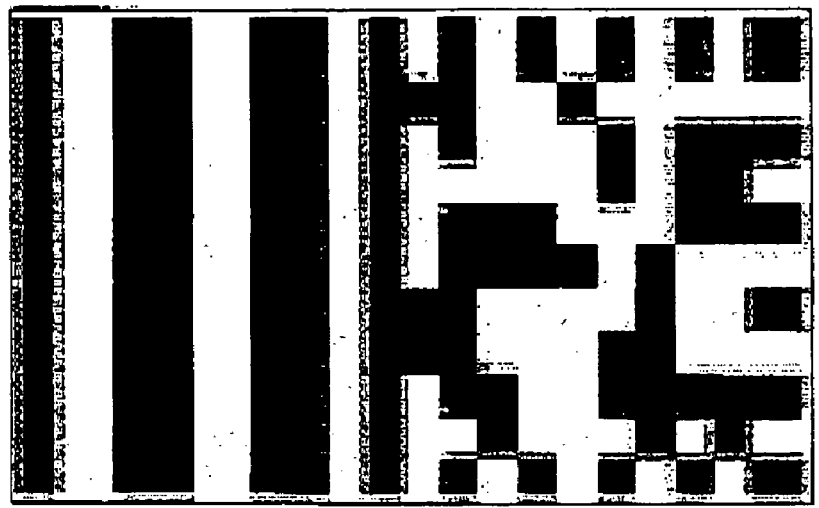
FIG. 2A illustrates typical pattern data.
Figure 2B:
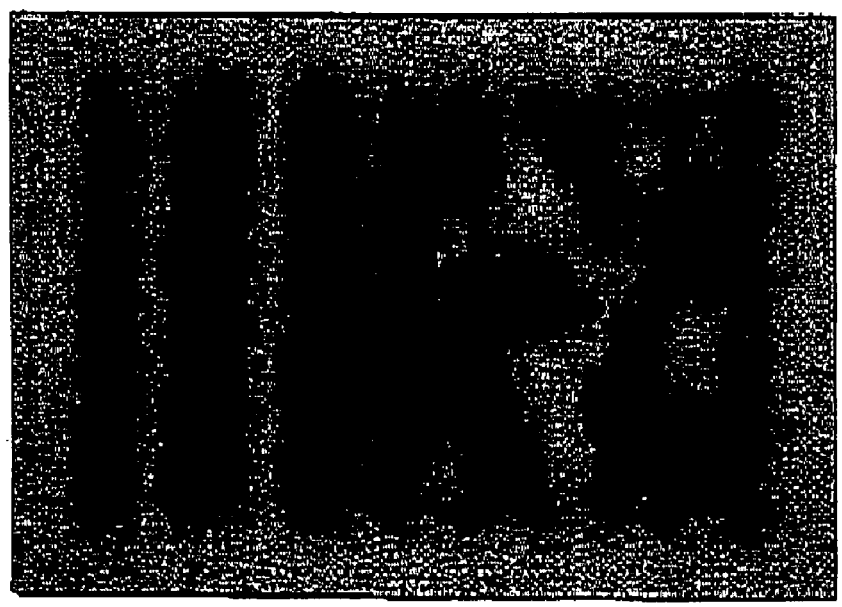
FIG. 2B illustrates a pattern data image corresponding to the pattern data shown in FIG. 2A which is recognized using conventional method of recognizing pattern data.
Figure 5:
FIG. 5 illustrates a pattern data image recognized according to a preferred embodiment of the present invention.

FIG. 5 illustrates a pattern image recognized using the method of recognizing pattern data according to a preferred embodiment of the present invention. The pattern image illustrated in FIG. 5 is the result obtained by recognizing the pattern data illustrated in FIG. 2A. Referring to FIG. 5, while the results obtained by recognizing the same original pattern data, i.e., the pattern data illustrated in FIG. 2A, are shown, edges of the pattern image of FIG. 5 obtained by recognizing the pattern data according to a preferred embodiment of the present invention are much clearer (and better defined) as compared to the recognized pattern data obtained by using the conventional method as shown in FIG. 2B. Thus, a pattern data recognition rate in the method of recognizing pattern data according to a preferred embodiment of the present invention considerably increases compared to the conventional method of recognizing pattern data.

As described above, according to the present invention, a high frequency component used to more clearly recognize edge portions from pattern data sensed through a camera equipped in a mobile station is extracted with Y data generally used to recognize pattern data. The high frequency component and the Y data are weighted with predetermined weights, and input data is generated using the high frequency component and Y data weighted with the predetermined weights. Accordingly, a recognition rate of the pattern image can be more increased by more clearly defining the edge portions of the input data.

In addition, while input data containing Cb data has been generated by simply extracting Y data and Cb data from pattern data and weighting the extracted Y data and Cb data with the predetermined weights in preferred embodiments, the recognition rate of the pattern image can be increased by adjusting recognition resolution used to recognize the Y data and the Cb data from the pattern data. For example, the recognition rate may be increased by decreasing pre-set recognition resolution. That is, if the pre-set recognition resolution initially was set to a level of 256, sensed pattern data may be simplified by decreasing the recognition resolution to the level of 128, thereby increasing the pattern data recognition rate.

Figure 6:
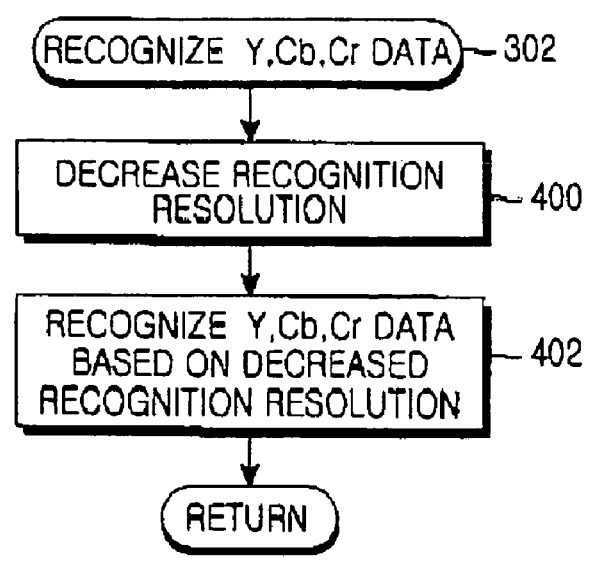
FIG. 6 is a detailed flowchart illustrating a process of extracting Y data and Cb data according to a preferred embodiment of the present invention.

FIG. 6 is a detailed flowchart illustrating the above-described process of decreasing the recognition resolution to increase the pattern data recognition rate more by adjusting the pre-set resolution, included in step 302 of recognizing the sensed pattern data as Y, Cb, and Cr data among steps illustrated in FIG. 4. Referring to FIG. 6, when the input of the pattern data is sensed in step 300, in step 400, the controller 200 of the mobile station according to a preferred embodiment of the present invention decreases recognition resolution of the pattern data sensing unit 218 included in the camera unit 216. In step 402, Y data, Cb data, and Cr data are recognized based on the recognition resolution decreased in step 400. After the Y data, the Cb data, and the Cr data are recognized, in step 304, the Y data and the Cb data are extracted among the recognized data. Thus, when the process illustrated in FIG. 6 is included in step 302 of FIG. 4, the recognized pattern data is simplified, and therefore, the recognition rate of the pattern data can be increased. While it has been illustrated in a certain preferred embodiment of the present invention that Cb data, which is a high frequency component of pattern data, is used and a recognition rate is increased by extracting Y data and Cb data with decreased resolution and using the extracted Y data and Cb data, of course the pattern data recognition rate can be increased using only the method of decreasing resolution illustrated in FIG. 6. In addition, since the process of decreasing recognition resolution proceeds when pattern data is recognized in the pattern data recognition process according to a preferred embodiment of the present invention, the recognition rate of the pattern data can be increased by temporarily decreasing the recognition resolution regardless of storage resolution used when an image is stored in the camera unit 216.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for recognizing pattern data in a mobile station having a pattern data recognition function, the apparatus comprising:
   a pattern data sensing unit for recognizing the pattern data as brightness component Y data, high frequency component Cb data, and low frequency component Cr data, and for extracting only the brightness component Y data and the high frequency component Cb data from the pattern data when an input of the pattern data is detected;
   a pattern data recognizing unit for weighting the extracted brightness component Y data with a first weight, weighting the extracted high frequency component Cb data with a second weight, and then generating input data for recognizing an image according to the pattern data using the brightness component Y data weighted with the first weight, the high frequency component Cb data weighted with the second weight, and a compensation value that compensates the weighted data so that the input data is a recognizable and valid value; and
   a controller for controlling the pattern data sensing unit to output the extracted brightness component Y data and the extracted high frequency component Cb data to the pattern data recognizing unit and recognizing the image according to the pattern data by receiving the input data,
   wherein the recognized image is displayed using only the brightness component Y data weighted with the first weight and the high frequency component Cb data weighted with the second weight.

2. The apparatus of claim 1, wherein, when an input of the pattern data is detected, the pattern data sensing unit
   decreases a first recognition resolution to obtain a second recognition resolution; and
   extracts the brightness component Y data and the high frequency component data using the second recognition resolution which is used to recognize pattern data.

3. A method for recognizing pattern data in a mobile station having a pattern data recognition function, the method comprising:
   detecting an input of the pattern data;
   recognizing the pattern data as brightness component Y data, high frequency component Cb data, and low frequency component Cr data, and extracting only the brightness component Y data and high frequency component Cb data from the pattern data, at a pattern data sensing unit of the mobile station;
   weighting the extracted brightness component Y data and the extracted high frequency component Cb data with respective weights and thereafter generating input data for recognizing an image according to the pattern data using the weighted brightness component Y data, the weighted high frequency component Cb data, and a compensation value that compensates the weighted data so that the input data is a recognizable and valid value, at a pattern data recognizing unit of the mobile station; and recognizing the image according to the pattern data using the generated input data, at a controller of the mobile station;

wherein the recognized image is displayed using only the weighted brightness component Y data and the weighted high frequency component Cb data.

4. The method of claim 3, wherein in the step of generating input data, the input data is generated by weighting the brightness component Y data and the high frequency component Cb data according to the following equation:

input data=(brightness component $Y$ data×third weight+high frequency component $Cb$ data× fourth weight−compensation value)/fifth weight, wherein the third weight is a predetermined weight corresponding to the brightness component Y data, the fourth weight is a predetermined weight corresponding to the high frequency component Cb data, the compensation value is a predetermined value which is used to compensate the weighted values such that the input data corresponds to be derived within a recognizable, valid value, and the fifth weight is a constant which is used to obtain an average of the weights on the brightness component Y data and the high frequency component Cb data.

5. The method of claim 3, wherein the step of extracting brightness component Y data and high frequency component Cb data further comprises:

decreasing recognition resolution from a first recognition resolution to obtain second recognition resolution which is used to recognize the pattern data when the input of the pattern data is detected.

* * * * *